US007565371B2

(12) United States Patent
Zeller

(10) Patent No.: US 7,565,371 B2
(45) Date of Patent: Jul. 21, 2009

(54) SYSTEM AND METHOD FOR CONVERTING COMPLEX MULTI-FILE DATABASE STRUCTURES TO HTML

(75) Inventor: Rudolf Zeller, Neumarkt (DE)

(73) Assignee: Siemens Aktiengesellschaft (DE)

( * ) Notice: Subject to any disclaimer, the term of this patent is extended or adjusted under 35 U.S.C. 154(b) by 381 days.

(21) Appl. No.: 11/225,290

(22) Filed: Sep. 13, 2005

(65) Prior Publication Data
US 2007/0074103 A1    Mar. 29, 2007

(51) Int. Cl.
G06F 17/30    (2006.01)
(52) U.S. Cl. .................... 707/102; 707/100; 707/104.1; 715/234; 715/236; 715/239; 715/501.1; 715/513
(58) Field of Classification Search .................. 707/100, 707/104.1; 715/501.1, 513, 523, 234, 236, 715/239, 1.1
See application file for complete search history.

(56) References Cited

U.S. PATENT DOCUMENTS

| | | | | | |
|---|---|---|---|---|---|
| 5,745,360 | A | * | 4/1998 | Leone et al. | 715/236 |
| 6,925,595 | B1 | * | 8/2005 | Whitledge et al. | 715/234 |
| 7,024,415 | B1 | * | 4/2006 | Kreiner et al. | 707/101 |
| 7,117,210 | B2 | * | 10/2006 | DeSalvo | 707/10 |
| 7,127,444 | B2 | * | 10/2006 | Peake et al. | 707/1 |
| 7,225,399 | B2 | * | 5/2007 | Watson | 715/210 |
| 7,257,771 | B2 | * | 8/2007 | Buser et al. | 715/239 |
| 7,305,657 | B2 | * | 12/2007 | Noda | 717/106 |
| 2002/0156702 | A1 | * | 10/2002 | Kane | 705/27 |
| 2004/0019853 | A1 | * | 1/2004 | Takizawa et al. | 715/523 |
| 2005/0039113 | A1 | * | 2/2005 | Balducci et al. | 715/503 |
| 2006/0106822 | A1 | * | 5/2006 | Lee et al. | 707/100 |
| 2006/0136449 | A1 | * | 6/2006 | Parker et al. | 707/101 |
| 2007/0174486 | A1 | * | 7/2007 | Holstege | 709/246 |

OTHER PUBLICATIONS

"Custom Fit Software" website hosting information and contact, obtained from internet address, http://www.orbit.org/(5ocxyw45f2mfcm55j5u2jg55)/contact.aspx, 8 pages, Jul. 21, 2005.
Microsoft Excel 2003 Help on the topic "About putting Excell data on the Web", obtained from internet address, mk:@MSIT Store:C:\Program%20Files\Microsoft%20Office\OFFICE11\1033\x1main11.c . . . , 6 pages, Jul. 21, 2005.

* cited by examiner

Primary Examiner—Don Wong
Assistant Examiner—Hanh B Thai
(74) Attorney, Agent, or Firm—James L. Katz; Brinks Hofer Gilson & Lione

(57) ABSTRACT

The disclosed embodiments relate to a system and method to convert multi-file database structures to Hypertext Markup Language ("HTML"). In particular, the disclosed embodiments convert multiple workbook files, generated by the Microsoft Excel spreadsheet program, into HTML including converting inter-file references to appropriate functional hyperlinks. The disclosed embodiments perform a two-pass conversion process, the first of which converts each of the workbook files to HTML and generates a list identifying all of the inter-file links/references which are not converted An HTML equivalent hyperlink is also generated which is stored in the list in association with the identified link/reference. On the second pass, each of the newly created HTML files is processed to replace the unconverted link/reference with the generated HTML equivalent hyperlink. The resulting HTML files are fully converted and properly linked.

19 Claims, 2 Drawing Sheets

SYSTEM AND METHOD FOR CONVERTING COMPLEX MULTI-FILE DATABASE STRUCTURES TO HTML

REFERENCE TO RELATED APPLICATIONS

The following co-pending and commonly assigned U.S. Patent Application has been filed on the same date as the present application. This application relates to and further describes other aspects of the embodiments disclosed in the present application and is herein incorporated by reference.

U.S. patent. application Ser. No. 11/225,252, "SYSTEM AND METHOD FOR ANALYSIS AND DISPLAY OF WORKFLOWS", filed herewith.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Electronic spreadsheets are a form of flat-file database and offer an extremely flexible environment for capturing or modeling data, both graphical and textual, in a myriad of applications, such as accounting, data processing, etc. An exemplary spreadsheet program is Microsoft Excel, published by Microsoft Corporation, located in Redmond, Wash. In addition to allowing data within a given spreadsheet, typically referred to as "worksheet," to be related, e.g. allow reference or links between data items, these programs further allow the creation and relation of independent data files, each data file, typically referred to as a "workbook," containing one or more worksheets, i.e. separate flat-file databases, to further enhance flexibility. The ability to relate worksheets, and the data contained therein, within or across workbooks permits data to be linked allowing for more flexible application design. For example, utilizing multiple interlinked worksheets and workbooks permits a user to capture or model complex relationships which may be too cumbersome to capture or model in a single worksheet.

Often it is desirable to share worksheets or workbooks with other users, and in particular, with other users who may not have access to the original spreadsheet program by which the worksheets or workbooks were created. It is therefore useful to be able to convert the spreadsheets or workbooks from the proprietary file format used by the particular spreadsheet program to a non-proprietary format which can be easily shared. One such non-proprietary format is the Hypertext Markup Language ("HTML") which may be viewed using any standard HTML compatible browser program, such as Microsoft Internet Explorer, published by Microsoft Corporation, located in Redmond, Wash. or Netscape, published by Netscape Communications Corp, located in San Jose, Calif. Once converted, the HTML representation of the worksheets or workbooks may be easily shared with others.

Microsoft Excel makes a built-in HTML converter available. This converter makes it possible to convert an individual workbook (made up of a plurality of worksheets), or to convert a single worksheet, into HTML. However, converting a plurality of separate files, i.e. workbooks, is not supported; in particular, references between data items or worksheets which span multiple workbooks, e.g. hyperlinks between workbooks, i.e. between worksheets in different workbooks, are not converted to HTML by Excel's conversion functionality.

Accordingly, there is a need for a system and method to convert references which span workbooks to proper HTML hyperlinks when the workbooks are converted to HTML.

DETAILED DESCRIPTION OF THE DRAWINGS AND PRESENTLY PREFERRED EMBODIMENTS

Figure 1:
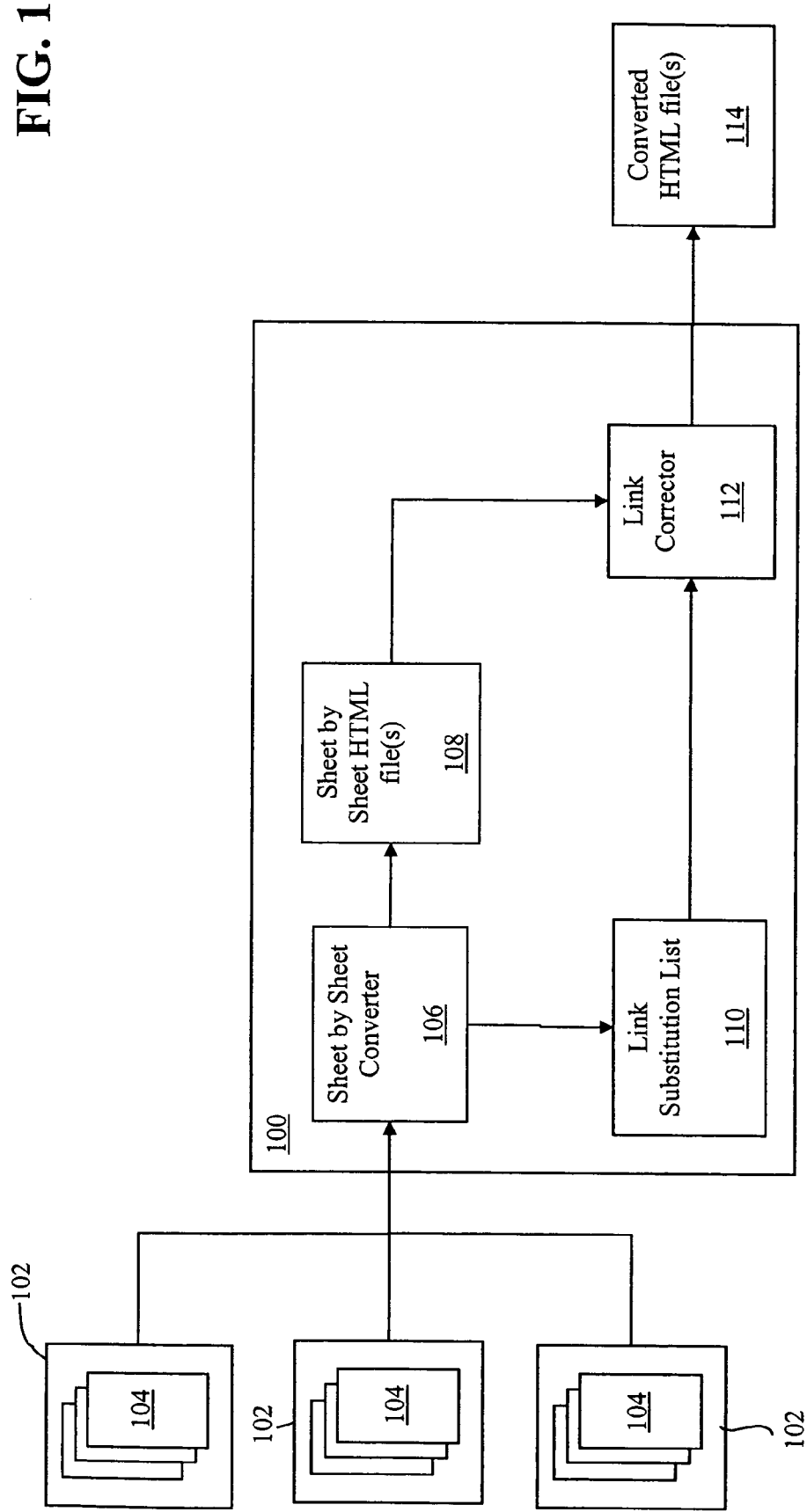
FIG. 1 depicts a block diagram of a system for converting multi-file data structures to Hypertext Markup Language according to one embodiment.

The disclosed embodiments relate to a system and method to convert multi-file database structures to Hypertext Markup Language ("HTML"). In particular, the disclosed embodiments convert multiple workbook files, generated by the Microsoft Excel spreadsheet program, into HTML including converting inter-file, e.g. inter-workbook, references to appropriate functional hyperlinks. The disclosed embodiments perform a two-pass conversion process, the first of which converts each of the individual workbook files, and the worksheets therein, to HTML and generates a list identifying all of the inter-file links/references which are not converted An HTML equivalent hyperlink is also generated which is stored in the list in association with the identified link/reference. On the second pass, each of the newly created HTML files is processed to replace the unconverted link/reference with the generated HTML equivalent hyperlink. The resulting HTML files are fully converted and properly linked.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

It will be appreciated that the disclosed embodiments may be used for conversion to other markup languages which utilize hyperlinks, such as Standard Generalized Markup Language ("SGML"), Extensible Markup Language ("XML"), or derivatives thereof, whether now available or later developed. Further, the disclosed embodiments may also be used for conversion to proprietary markup languages which use hyperlinks or other similar constructs to relate data across data files, whether those languages are now available or later developed. Further, the disclosed embodiments are not limited to working with files created by Microsoft Excel and may be utilized with any files, such as flat-file database files, containing inter-file references which are not properly converted to HTML hyperlinks when the individual files are converted.

In particular, each sheet of all the workbooks to be converted are converted individually to HTML, information about inter-worksheet, i.e. worksheet-to-worksheet, and inter-workbook, e.g. workbook-to-workbook, file-to-file and/or worksheet of one workbook to a worksheet of another workbook, links/references, or combinations thereof, is noted and these references/links are corrected in a separate operation. It will be appreciated that, while the disclosed embodiments relate to a two-pass system wherein the files are first converted and then the affected links are corrected, a single pass system where conversion and correction occur in one operation is also contemplated.

The first-pass conversion of the individual workbooks to HTML is accomplished using the built-in HTML converter provided by Microsoft Excel. A macro, written using Microsoft Visual Basic, performs the analysis to identify the inter-worksheet and inter-workbook links/references that are not converted by this built-in HTML converter. The macro also resolves and generates an HTML equivalent hyperlink for the identified links/references and stores these HTML equivalent hyperlinks along with the corresponding identified links/references in a list file. It will be appreciated that the functionality of the macro may be implemented in other programming languages known in the art. To properly generate the HTML equivalent hyperlinks, each worksheet in each workbook must be uniquely and unambiguously identified, e.g. uniquely named using the provided-for functionality of Excel. It Will be appreciated that this unique naming may be accomplished manually by the user prior to conversion, or may be automatically checked and implemented by the disclosed system.

For each of these individual sheets, the syntax of the original Microsoft Excel link/reference can be easily derived and buffered. Further, the new HTML equivalent hyperlink, at which the worksheet, now converted into HTML, can be reached, is also generated and stored in memory together with Microsoft Excel link/reference. This is performed for all the worksheets of all the workbooks. As a result, all the worksheets converted into HTML, and a list of all the links with the old and new link designations, are created.

This so-called link list is, in a subsequent process, revised further to ensure proper syntax and structure of the HTML equivalent hyper link. In particular, the following adaptations are performed:

1. Necessary special character adaptations that are required because of HTML are performed;
2. Syntax adaptations are made, e.g. empty characters within the Microsoft Excel links/references, must be converted into apostrophes; and
3. In order also to include links inside workbooks, the previously generated links are "doubled" and the "path" also present in the links is deleted.

Finally, this list is reformatted for further use (see Appendix B for an excerpt from an exemplary converted link list). As discussed above, these functions are accomplished via a Visual Basic macro which operates with Microsoft Excel, an exemplary version of which is included at Appendix A. It will be appreciated that the necessary revisions to the link list are implementation dependent and that fewer or more revisions or adaptations may be necessary depending upon the implementation.

Once the list is complete, a separate operation is performed to substitute the newly generated HTML equivalent hyperlinks for the Microsoft Excel links which still remain in the converted HTML files produced by Microsoft Excel's HTML converter. Essentially, as the HTML files are simple text files, this is accomplished via a simple string substitution and, in one embodiment, is accomplished with a shareware computer program called BK ReplaceEM, published by CustomFit Software, located in Montreal, Quebec Canada and available at http://www.orbit.org/replace. It will be appreciated that any string substitution method may be utilized to perform the link substitution for each link/reference identified in the link list. At the end of this procedure, a fully linked, HTML-converted file set is available.

The method described makes it possible to convert more-complex, intrinsically linked Microsoft Excel workbooks and worksheets for display by HTML. The converted HTML files can then be presented, with suitably high performance, using a standard browser (such as Microsoft Internet Explorer). The elements in graphics and tables displayed, for instance, are thus linked to one another (and if desired or necessary, to the outside as well), and the display is thus "navigable."

In one embodiment, the Microsoft Excel workbook represents a model of a workflow, wherein each worksheet represents a portion of the workflow and the elements of which are interrelated, i.e. interlinked. As used herein, a workflow is defined as the activities, e.g. tasks or procedural steps, entities involved, i.e. actors or participants, such as people, organizations, machines, etc., inputs and outputs, states, requisite tools, and the relationships therebetween, for each step in a process. The various activities, entities, inputs, outputs, tools and relationships which make up the workflow are referred to as workflow elements. In one embodiment, the model is implemented according to Software Engineering Process framework (referred to as "SEP++") developed by Siemens AG, located in Germany.

FIG. 1 shows a block diagram of a system 100 for converting multi-file data structures 102, such as multiple Microsoft Excel workbooks and worksheets 104, to one or more HTML documents 114 according to one embodiment. The system 100 converts the plurality of related files 102 to one or more HTML files 114, where the files 102 to be converted contain at least one reference to another of the related files. The system 100 includes a converter 106 which converts each file, e.g. each worksheet 104 of each workbook 102, to HTML. In one embodiment, the plurality of related files 102 are one or more Microsoft Excel worksheets 104 and workbooks 102 containing a model of a workflow, each file 102 including a portion of the model wherein the at least on reference relates at least one element of the portion of the model with another element of another portion of the model. In this embodiment, the HTML files 114 generated by the system 100 are an interactive representation of the model.

The system 100 also includes a link corrector 112 coupled with the converter 106 and discussed in more detail below. Herein, the phrase "coupled with" is defined to mean directly connected to or indirectly connected through one or more intermediate components. Such intermediate components may include both hardware and software based components.

As described above, the converter 106 is operative to convert each of the plurality of related files 102 to at least one HTML file 108. In one embodiment, the converter 106 utilizes the built in HTML conversion functionality of Microsoft Excel which will not convert the references between files 102. In one embodiment, the converter 106 is further operative to create one HTML file 108 for each of the plurality of related files 102, wherein the remaining functionality is performed on each HTML file 108. The converter 106 further includes a link identifier (not shown) operative to identify each of un-converted references in each of the HTML files 108 which are generated. In one embodiment, the link identifier comprises a Microsoft Visual Basic macro, an example of which is shown in Appendix A.

The converter 16 further includes a link generator (not shown) operative to generate an HTML equivalent hyperlink corresponding to each of the identified unconverted reference. In one embodiment, the link generator is implemented as a Microsoft Visual Basic macro and may be further part of the macro which implements the link identifier described above. In one embodiment, the link generator is further operative to create a list 110 of each of the identified unconverted references and the corresponding HTML equivalent thereto. In yet another embodiment, the link generator is further operative to reformat the unconverted reference to remove non-standard elements therefrom and order each of the unconverted references and the corresponding HTML equivalent thereto in the list 110 on adjacent lines of the list. One example of such a list is shown in Appendix B.

Once the HTML files 108 for each of the plurality of related files 102 have been created, along with the link list 110, the link corrector 112 replaces, for each of the references not converted to the HTML equivalent thereof in the particular HTML file, the at least one reference with the generated HTML equivalent corresponding thereto. In one embodiment, the link corrector 112 replaces each unconverted reference with the generated HTML equivalent corresponding thereto based on the list 110. In one embodiment, the link corrector 112 comprises a text/string substitution program such as BK ReplaceEM, published by CustomFit Software, located in Montreal, Quebec Canada and available at http://www.orbit.org/replace.

The resulting HTML files 114 are full converted and linked.

Figure 2:
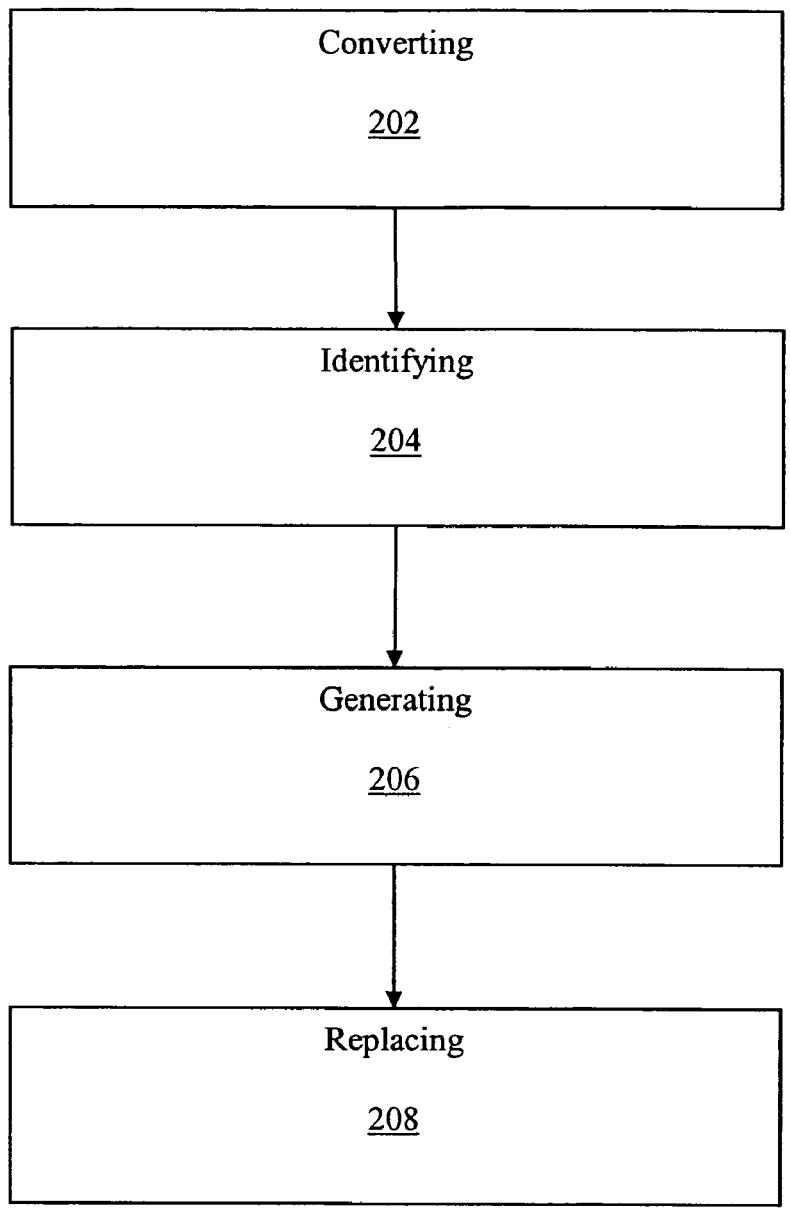
FIG. 2 shows a flow chart of a method for converting multi-file data structures to Hypertext Markup Language, according to the embodiment of FIG. 1.

FIG. 2 shows a flow chart of a method for converting multi-file data structures, according to the embodiment of FIG. 1. In particular, the method converts a plurality of related files, such as Microsoft Excel workbooks, to one or more hypertext markup language ("HTML") documents where at least one of the plurality of related files contains at least one reference to another of the related files. For example, the files may comprise a model of a workflow, each file including a portion of the model wherein the at least on reference relates at least one element of the portion of the model with another element of another portion of the model and where he at least one HTML file comprises an interactive representation of the model.

The method includes converting each of the plurality of related files to at least one HTML file wherein at least one of the at least one reference is not converted to a HTML equivalent thereof (block 202). In one embodiment, the converting results in one HTML file for each of the plurality of related files. In addition, the method includes identifying each of the at least one reference not converted to the HTML equivalent thereof in each of the plurality of related files (block 204); and generating the HTML equivalent corresponding to each of the identified at least one reference (block 206). In one embodiment, the generating further comprises creating a list of each of the identified at least one reference and the corresponding HTML equivalent thereto. In another embodiment, the creating further includes ordering each of the at least one reference and the corresponding HTML equivalent thereto in the list on adjacent lines of the list. In yet another embodiment, the generating further includes reformatting the at least one reference to remove non-standard elements therefrom.

The method further includes replacing, for each of the at least one reference not converted to the HTML equivalent thereof in the particular at least one HTML file, the at least one reference with the generated HTML equivalent corresponding thereto (block 208). In one embodiment, the replacing further comprises replacing the at least one reference with the generated HTML equivalent corresponding thereto based on a list of the unconverted references and the associated HTML equivalent hyperlinks.

Appendix A shows an exemplary Microsoft Visual Basic macro for identifying inter-workbook links, generating HTML equivalent hyperlinks thereto and creating a list file containing the identified links and their HTML equivalents for subsequent processing. Appendix B shows an exemplary link list of identified inter-workbook links and their HTML equivalents.

It is therefore intended that the foregoing detailed description be regarded as illustrative rather than limiting, and that it be understood that it is the following claims, including all equivalents, that are intended to define the spirit and scope of this invention.

APPENDIX A

```
Sub xls2htm( )
'----------------------------------------------------------------------
' Beschreibung: Konvertierung aller EXCEL-Dateien des SEP++ Prozessmodells, die dieses
'       beschreiben, nach HTML und erzeugen einer Referenzliste welche die innerhalb
'       der EXCEL-Dateien verwendeten Links denen der neu erzeugten HTML-Dateien
'       zuordnet. In dieser Referenzliste werden bereits die notwendigen Sonderzeichen-
'       anpassungen welche durch HTML notwendig werden vorgenommen. Es wird auch die
'       für das spätere "suchen und ersetzen" notwendige Sortieren (Zeile 1 "Suchstring"
'       Zeile 2 "Ersetzstring", ...) als auch die "Verdopplung" und "Pfadreduzierung"
'       vorgenommen um alle Links (die innerhalb eines EXEL-Worksheets vorhanden sind)
'       zu ersetzen.
' Autor:     R. Zeller, 12.11.04, S. Brockmann, 10.11.04
' Validierung: nicht notwendig, Funktionsprüfung erfolgt immer durch eine (nicht dokumentierte)
'       Stichprobenprüfung des erzeugten HTML-Modells. Weitergehende Tests und Dokumentationen
'       sind beschrieben im Dokument: "Paketieren&Publizieren d. SEP++ Modells"
'       8388170-ASD-PKG-..'
'----------------------------------------------------------------------
Application.ScreenUpdating = False
HomePath = Workbooks("Makros.xla").Path
Dim TempExcel(1000) As String
Dim TempHtml(1000) As String
Dim OverviewExcel(1000) As String
Dim OverviewHtml(1000) As String
Dim NameOfSheet As String
Dim NameOfHtml As String
```

APPENDIX A-continued

```
Dim Namexls As String
Dim NameHtml As String
Dim NamHSh As String
Dim i, j, n, m As Integer
Dim WS As Worksheet
Dim WSName As String
Dim OverviewFull As String
Dim Numbers As Integer
Dim CellCopy As String
Dim CellPaste As String
Dim Position As Integer
Dim Laenge As Integer
With Application.FileSearch
   .LookIn = HomePath
   .SearchSubFolders = True
   .FileType = msoFileTypeExcelWorkbooks
   .Execute
   n = 1
'   Dateien incl. der Sheets konvertieren
   For i = 1 To .FoundFiles.Count
      If .FoundFiles(i) <> HomePath & "\Makros.xla" _
      And .FoundFiles(i) <> HomePath & "\ActivityMatrix.xls" _
      And .FoundFiles(i) <> HomePath & "\ArtifactMatrix.xls" _
      And .FoundFiles(i) <> HomePath & "\format\_Art_Tlt.xls" _
      And .FoundFiles(i) <> HomePath & "\format\_Act_Tlt.xls" _
      And .FoundFiles(i) <> HomePath & "\format\Roles_Tlt.xls" _
      And .FoundFiles(i) <> HomePath & "\format\Links.xlt" _
      And .FoundFiles(i) <> HomePath & "\SEP++.xla" Then
         Workbooks.Open FileName:=.FoundFiles(i)
         OverviewExcel(i) = .FoundFiles(i)
         OverviewHtml(i) = Left(.FoundFiles(i), Len(.FoundFiles(i)) – 4) & "_Overview.htm"
'         Zellen-Schutz aufheben und an den Beginn des Worksheets springen
         For Each WS In ActiveWorkbook.Worksheets
            WS.Unprotect Password:=PassWd
            WSName = Left(WS.Name, 8)
            If (WSName = "Overview") Then OverviewFull = WS.Name
         Next WS
         ActiveWindow.DisplayWorkbookTabs = True
         ActiveWorkbook.Worksheets(OverviewFull).Select
         m = 1
'         Alle Workbooks incl. deren Sheets in HTML-Dateien umsetzen
         For Each WS In ActiveWorkbook.Worksheets
            NameOfSheet = WS.Name
            NameOfHtml = WS.Cells(3, 2).Value
            Application.DisplayAlerts = True
            Namexls = .FoundFiles(i) & "#" & NameOfSheet & "'!A1"
            NameHtml = Left(.FoundFiles(i), Len(.FoundFiles(i)) – 4) & "_" & NameOfHtml & ".htm"
            With ActiveWorkbook.PublishObjects.Add(xlSourceSheet, NameHtml _
               , NameOfSheet, "", xlHtmlStatic, "", "")
               .Publish (True)
            End With
'            Linkbezeichnung in die Temporäre Ablagen schreiben:
            TempExcel(n) = Namexls
            TempHtml(n) = NameHtml
            n = n + 1
            m = m + 1
         Next WS
         ActiveWorkbook.Save
         ActiveWorkbook.Close
      End If
   Next i
' 1. Teil der Linkliste mit den xls-Links und den html-Links vorbereiten/füllen!
   Workbooks.Add
   Columns("A:B").Select
   Selection.ClearContents
   For i = 1 To n – 1
      Worksheets("Sheet1").Cells(i, 1).Value = TempExcel(i)
      Worksheets("Sheet1").Cells(i, 2).Value = TempHtml(i)
   Next i
' Konvertierung der in HTML verwendeten Sonderzeichen "\", "_" und " "
   Columns("A:B").Select
   Selection.Replace What:=HomePath & "\", Replacement:="", _
      LookAt:=xlPart, SearchOrder:=xlByRows, MatchCase:=False
   Selection.Replace What:="&", Replacement:="&", _
      LookAt:=xlPart, SearchOrder:=xlByRows, MatchCase:=False
   Columns("B:B").Select
   Selection.Replace What:=" ", Replacement:="%20", _
      LookAt:=xlPart, SearchOrder:=xlByRows, MatchCase:=False
' in EXCEL werden in den Link-Stings wenn diese einen " " beinhalten mit """
```

APPENDIX A-continued

```
' begrenzt, daher werden die Linkbezeichnung sowohl mit und ohne """ angelegt
    Numbers = Application.WorksheetFunction.CountA(Range("A:A"))
' CellCopy = "A1:B" & Numbers
' CellPaste = "A" & Numbers + 1 & ":B" & Numbers * 2
    Range("A1:B" & Numbers).Select
    Selection.Copy
    Range("A" & Numbers + 1 & ":B" & Numbers * 2).Select
    ActiveSheet.Paste
    Selection.Replace What:="""', Replacement:="", _
        LookAt:=xlPart, SearchOrder:=xlByRows, MatchCase:=False
' 2. Teil Linkbezeichnung anlegen für "interne" (innerhalb eines xls Workbooks) Links
    Range("A1:B" & Numbers * 2).Select
    Selection.Copy
    Range("A" & (Numbers * 2) + 1 & ":B" & (Numbers * 2) * 2).Select
    ActiveSheet.Paste
    For i = (Numbers * 2) + 1 To (Numbers * 2) * 2
        Position = InStr(Worksheets("Sheet1").Cells(i, 1).Value, "#")
        Laenge = Len(Worksheets("Sheet1").Cells(i, 1).Value)
        Worksheets("Sheet1").Cells(i, 1).Value = Right(Worksheets("Sheet1").Cells(i, 1).Value, Laenge – Position
+ 1)
        Position = InStr(Worksheets("Sheet1").Cells(i, 2).Value, "\")
        Laenge = Len(Worksheets("Sheet1").Cells(i, 2).Value)
        Worksheets("Sheet1").Cells(i, 2).Value = Right(Worksheets("Sheet1").Cells(i, 2).Value, Laenge – Position)
    Next i
' Achtung, wird die Linkliste.csv erzeugt, dann bitte den Absatz
' Linkliste.txt vollständig "auskommentieren". Die Linkliste.csv erleichtert
' die "optische" Prüfung der abgelegten Linknamen
'   ActiveWorkbook.SaveAs FileName:=HomePath & "\Linkliste.csv", _
'       FileFormat:=xlCSV, CreateBackup:=False
' Absatz Linkliste.txt Anfang
' Erzeugt die Liste im Format, welches mit dem Tool "BK ReplaceEm" weiterverarbeitet werden kann
' Sortierung: EXCEL-Linkbezeichnung in der ungeraden Zeilennummer, HTML-Linkbezeichnung in der
' geraden darauf folgenden Zeilennummer.
    For i = Numbers * 8 To 4 Step –4
        Worksheets("Sheet1").Cells(i, 1).Value = Worksheets("Sheet1").Cells(i / 2, 2).Value
        Cells(i / 2, 2).Select
        Selection.ClearContents
        Worksheets("Sheet1").Cells(i – 1, 1).Value = Worksheets("Sheet1").Cells(i / 2, 1).Value
        Worksheets("Sheet1").Cells(i – 2, 1).Value = Worksheets("Sheet1").Cells(i / 2 – 1, 2).Value
        Cells(i / 2 – 1, 2).Select
        Selection.ClearContents
        Worksheets("Sheet1").Cells(i – 3, 1).Value = Worksheets("Sheet1").Cells(i / 2 – 1, 1).Value
    Next i
    ActiveWorkbook.SaveAs FileName:=HomePath & "\Linkliste.txt", _
        FileFormat:=xlTextMSDOS, CreateBackup:=False
'   Absatz Linkliste.txt Anfang
    Active Workbook.Close
End With
End Sub
```

APPENDIX B

```
Activities.xls#'Overview Act'!A1
Activities__Overview%20Activity.htm
Activities.xls#'by Name Activity'!A1
Activities__Overview%20by%20Name%20Activity.htm
Activities.xls#'by Actor Activity'!A1
Activities__Overview%20by%20Actor%20Activity.htm
Activities.xls#'by Phase Activity'!A1
Activities__Overview%20by%20Phase%20Activity.htm
Workflows\Architecture&Technology__Wfl.xls#'Overview ArT'!A1
Workflows\Architecture&Technology__Wfl__Overview%20ArT.htm
Workflows\Architecture&Technology__Wfl.xls#'Technology Watch'!A1
Workflows\Architecture&Technology__Wfl__SW%20Technology%20Watch.htm
Workflows\Architecture&Technology__Wfl.xls#'Global Architecture Maintenance'!A1
Workflows\Architecture&Technology__Wfl__Global%20Architecture%20Maintenance.htm
Workflows\Architecture&Technology__Wfl.xls#'Tool Evaluation'!A1
Workflows\Architecture&Technology__Wfl__Tool%20Evaluation.htm
Workflows\Architecture&Technology__Wfl.xls#'Programming Guidelines Maintena'!A1
Workflows\Architecture&Technology__Wfl__Programming%20Guidelines%20Maintenance.htm
Workflows\Architecture&Technology__Wfl.xls#'Developer Support'!A1
Workflows\Architecture&Technology__Wfl__Developer%20Support.htm
Activities\Architecture&Technology__Act.xls#'Overview ArT Act'!A1
Activities\Architecture&Technology__Act__Overview%20ArT.htm
Activities\Architecture&Technology__Act.xls#'Maintain Technology List'!A1
Activities\Architecture&Technology__Act__Maintain%20Technology%20List.htm
```

APPENDIX B-continued

```
Activities\Architecture&Technology__Act.xls#'Evaluate Patents'!A1
Activities\Architecture&Technology__Act__Evaluate%20SAG%20and%203rd%20party%20Patents.htm
Activities\Architecture&Technology__Act.xls#'Analyse Technology Impact'!A1
Activities\Architecture&Technology__Act__Analyze%20and%20Evaluate%20Technology%20Impact.htm
Activities\Architecture&Technology__Act.xls#'Specify Architecture Roadmap'!A1
Activities\Architecture&Technology__Act__Specify%20Architecture%20Roadmap.htm
Activities\Architecture&Technology__Act__xls#'Specify Architecture'!A1
Activities\Architecture&Technology__Act__Specify%20Architecture.htm
Activities\Architecture&Technology__Act.xls#'Identify internal ProductTopic'!A1
Activities\Architecture&Technology__Act__Identify%20(internal)%20Product%20Topics.htm
Activities\Architecture&Technology__Act.xls#'Propose Tool'!A1
Activities\Architecture&Technology__Act__Propose%20Tool.htm
Activities\Architecture&Technology__Act.xls#'Make or Buy new Tool'!A1
Activities\Architecture&Technology__Act__Make%20or%20Buy%20new%20Tool.htm
Activities\Architecture&Technology__Act.xls#'Specify Tool and Validation'!A1
Activities\Architecture&Technology__Act__Specify%20Tool%20and%20Validation.htm
Activities\Architecture&Technology__Act.xls#'Validate new Tool'!A1
Activities\Architecture&Technology__Act__Validate%20new%20Tool.htm
```

I claim:

1. A method for converting each of a plurality of related files, to one or more corresponding hypertext markup language ("HTML") documents, at least one of the plurality of related files containing at least one reference to another of the related files, the method comprising:

(a) converting each of the plurality of related files to at least one HTML file corresponding thereto using a first process, wherein the first process is incapable of converting at least one of the at least one reference to a HTML equivalent thereof;

(b) identifying, automatically by a second process different than the first process, each of the at least one reference not converted to the HTML equivalent thereof in each of the plurality of related files;

(c) generating, automatically by the second process, the HTML equivalent corresponding to each of the identified at least one reference; and (d) replacing, automatically by the second process, for each of the at least one reference not converted to the HTML equivalent thereof in the particular at least one HTML file, the at least one reference with the generated HTML equivalent corresponding thereto, wherein the HTML equivalent comprises a reference from the at least one HTML file corresponding to the at least one of the plurality of files to the at least one HTML file corresponding to the other of the related files referred to by the at least one reference.

2. The method of claim 1, wherein each of the related files comprises an excel file including of at least one worksheet.

3. The method of claim 1, wherein the generating further comprises creating a list of each of the identified at least one reference and the corresponding HTML equivalent thereto.

4. The method of claim 3, wherein the replacing further comprises replacing the at least one reference with the generated HTML equivalent corresponding thereto based on the list.

5. The method of claim 3, wherein the generating further includes reformatting the at least one reference to remove non-standard elements therefrom.

6. The method of claim 3, wherein the creating further includes ordering each of the at least one reference and the corresponding HTML equivalent thereto in the list on adjacent lines of the list.

7. The method of claim 1, wherein the converting results in one HTML file for each of the plurality of related files, the identifying, generating and replacing being performed on all of the HTML files.

8. The method of claim 1, wherein the plurality of files comprise a model of a workflow, each file including a portion of the model wherein the at least on reference relates at least one element of the portion of the model with another element of another portion of the model.

9. The method of claim 8, wherein the at least one HTML file comprises an interactive representation of the model.

10. A system for converting each of a plurality of related files, to one or more corresponding hypertext markup language ("HTML") documents, at least one of the plurality of related files containing at least one reference to another of the related files, the system comprising:

a processor configured to convert each of the plurality of related files to at least one HTML file corresponding thereto using a first process wherein the first process is incapable of converting at least one of the at least one reference to a HTML equivalent thereof, the processor further configured to use a second process different from the first process to automatically identify each of the at least one reference not converted to the HTML equivalent thereof in each of the plurality of related files and, using the second process, to automatically generate an HTML equivalent corresponding to each of the identified at least one reference; and the processor being further configured to, using the second process, automatically replace, for each of the at least one reference not converted to the HTML equivalent thereof in the particular at least one HTML file, the at least one reference with the generated HTML equivalent corresponding thereto, wherein the HTML equivalent comprises a reference from the at least one HTML file corresponding to the at least one of the plurality of files to access the at least one HTML file corresponding to the other of the related files referred to by the at least one reference.

11. The system of claim 10, wherein each of the related files comprises an excel file including of at least one worksheet.

12. The system of claim 10, wherein the processor is further configured to create a list of each of the identified at least one reference and the corresponding HTML equivalent thereto.

13. The system of claim 12, wherein the link corrector is further operative to replace the at least one reference with the generated HTML equivalent corresponding thereto based on the list.

14. The system of claim 12, wherein the processor is further configured to reformat the at least one reference to remove non-standard elements therefrom.

15. The system of claim 12, wherein the processor is further configured to order each of the at least one reference and the corresponding HTML equivalent thereto in the list on adjacent lines of the list.

16. The system of claim 10, wherein the processor is further configured to create one HTML file for each of the plurality of related files, the link identifier, link generator and link corrector being performed on all of the HTML files.

17. The system of claim 10, wherein the plurality of files comprise a model of a workflow, each file including a portion of the model wherein the at least on reference relates at least one element of the portion of the model with another element of another portion of the model.

18. The system of claim 17, wherein the at least one HTML file comprises an interactive representation of the model.

19. A system for converting each of a plurality of related files, to one or more corresponding hypertext markup language ("HTML") documents, at least one of the plurality of related files containing at least one reference to another of the related files, the method comprising:

means for converting each of the plurality of related files to at least one HTML file corresponding thereto using a first process wherein the first process is incapable of converting at least one of the at least one reference to a HTML equivalent thereof;

means for identifying, automatically by a second process different from the first process, each of the at least one reference not converted to the HTML equivalent thereof in each of the plurality of related files;

means for generating, automatically by the second process, the HTML equivalent corresponding to each of the identified at least one reference; and means for replacing, automatically by the second process, for each of the at least one reference not converted to the HTML equivalent thereof in the particular at least one HTML file, the at least one reference with the generated HTML equivalent corresponding thereto, wherein the HTML equivalent comprises a reference from the at least one HTML file corresponding to the at least one of the plurality of files to access the at least one HTML file corresponding to the other of the related files referred to by the at least one reference.

* * * * *

UNITED STATES PATENT AND TRADEMARK OFFICE
CERTIFICATE OF CORRECTION

PATENT NO.       : 7,565,371 B2
APPLICATION NO.  : 11/225290
DATED            : July 21, 2009
INVENTOR(S)      : Rudolf Zeller It is certified that error appears in the above-identified patent and that said Letters Patent is hereby corrected as shown below:

<u>In the Claims</u>

In column 12, line 27, after "wherein the at least" replace "on" with --one--.

In column 13, line 18, after "wherein the at least" replace "on" with --one--.

Signed and Sealed this

Tenth Day of November, 2009

David J. Kappos
*Director of the United States Patent and Trademark Office*